US012608928B1

(12) United States Patent
Rajan et al.

(10) Patent No.: US 12,608,928 B1
(45) Date of Patent: Apr. 21, 2026

(54) ON-DEVICE MACHINE LEARNING CALIBRATION

(71) Applicant: Samsara Inc., San Francisco, CA (US)

(72) Inventors: Narendran Rajan, San Diego, CA (US); Sharan Srinivasan, Newark, CA (US); Jing Wang, Toronto (CA); Yan Wang, Mercer Island, WA (US)

(73) Assignee: Samsara Inc., San Francisco, CA (US)

( * ) Notice: Subject to any disclaimer, the term of this patent is extended or adjusted under 35 U.S.C. 154(b) by 156 days.

(21) Appl. No.: 18/055,322

(22) Filed: Nov. 14, 2022

(51) Int. Cl.
| | |
|---|---|
| *G06V 20/59* | (2022.01) |
| *G06V 10/26* | (2022.01) |
| *G06V 10/94* | (2022.01) |
| *G06V 20/56* | (2022.01) |
| *G06V 40/10* | (2022.01) |
| *G07C 5/08* | (2006.01) |

(52) U.S. Cl.
CPC ............. *G06V 10/94* (2022.01); *G06V 10/26* (2022.01); *G06V 20/588* (2022.01); *G06V 20/59* (2022.01); *G06V 40/10* (2022.01); *G07C 5/0866* (2013.01)

(58) Field of Classification Search
CPC ...................................................... G06V 20/59
See application file for complete search history.

(56) References Cited

U.S. PATENT DOCUMENTS

| | | | | |
|---|---|---|---|---|
| 11,238,376 | B1 * | 2/2022 | Mudgil | G06F 18/23 |
| 12,437,192 | B1 * | 10/2025 | Neagu | G06F 9/542 |
| 2018/0268244 | A1 * | 9/2018 | Moazzami | G06V 20/176 |

| | | | | |
|---|---|---|---|---|
| 2019/0034740 | A1 * | 1/2019 | Kwant | G06V 10/462 |
| 2019/0213429 | A1 * | 7/2019 | Sicconi | G06F 3/012 |
| 2019/0215339 | A1 * | 7/2019 | Chen | H04L 63/1425 |
| 2019/0337525 | A1 * | 11/2019 | Sippl | G06V 40/103 |
| 2020/0082269 | A1 * | 3/2020 | Gao | G06N 5/04 |
| 2020/0272899 | A1 * | 8/2020 | Dunne | G06N 3/08 |
| 2020/0293870 | A1 * | 9/2020 | Isikdogan | G06V 10/70 |
| 2021/0174103 | A1 * | 6/2021 | Schumacher | G06F 18/22 |
| 2021/0287040 | A1 * | 9/2021 | Al-Qunaieer | G06T 7/0002 |
| 2022/0129687 | A1 * | 4/2022 | Munir | G06F 18/25 |
| 2022/0246233 | A1 * | 8/2022 | Morrone | G06N 3/09 |
| 2022/0332310 | A1 * | 10/2022 | Seegmiller | G06V 20/582 |
| 2023/0023896 | A1 * | 1/2023 | Schmidt | G06N 3/09 |
| 2023/0080592 | A1 * | 3/2023 | Kroeller | G06N 3/044 701/533 |
| 2023/0281974 | A1 * | 9/2023 | Ramamonjison | G06V 10/764 382/157 |

* cited by examiner

*Primary Examiner* — Frank Johnson
(74) *Attorney, Agent, or Firm* — Nicholson De Vos Webster & Elliott LLP

(57) ABSTRACT

A method and apparatus of utilizing an edge device comprising storing in a memory a pre-installed trained machine learning model, the machine learning model comprising a fixed base portion and a flexible portion. The method further comprises, when the edge device is installed, collecting data using one or more sensors on the edge device, and using the fixed base portion of the machine learning model on the data for a first aspect classification, while using the flexible portion of the machine learning model for a second aspect classification. The method further comprises calibrating the flexible portion of the machine learning model during the use.

20 Claims, 7 Drawing Sheets

Start
610

Receive image data from camera
620

Apply fixed base portion machine learning to provide face detection
630

Apply flexible portion machine learning to do background-foregound separation
640

Disregard face detection in identified background
650

Use a combination of user feedback and data from the fixed base portion to calibrate the flexible portion
660

ON-DEVICE MACHINE LEARNING CALIBRATION

TECHNICAL FIELD

One or more embodiments relate to edge devices; and more specifically, to machine learning systems on edge devices.

BACKGROUND ART

The market is exploding with edge devices ranging from dash cameras and home security cameras to robots and other devices. Many of these edge devices are designed to utilize machine learning systems for example to recognize potential dangers. However, these edge devices have limited memory and processing power.

One way of enabling machine learning on such edge devices is to create and train a machine learning system on a server, and then upload the fully trained system to the edge device. The edge device can then use its limited memory and processing power to run the machine learning system.

However, this design has some limitations, especially for edge devices which are not factory installed. For example, after market dashboard cameras are installed by users. Therefore, the precise position of the camera with respect to the vehicle, the road, and the driver is not fixed. Because the machine learning system is pre-trained, the system may not perform well.

BRIEF DESCRIPTION OF THE DRAWINGS

The following figures use like reference numbers to refer to like elements. Although the following figures depict various exemplary embodiments, alternative embodiments are within the spirit and scope of the appended claims. In the drawings:

DETAILED DESCRIPTION

The following description describes methods and apparatus for creating a customized edge device system, running an improved machine learning system. In one embodiment, the customized machine learning system includes a fixed base portion and a flexible configurable portion. In one embodiment, the customized machine learning system may be configured based on user feedback, data from the fixed portion, and/or data from past analysis by the machine learning system. In non-limiting examples, the edge devices can be used in fleet management applications, asset tracking applications, industrial applications (manufacturing analytics, process monitoring, condition monitoring), and remote monitoring of environments (such as in factories, warehouses, etc.), etc. In non-limiting examples, the edge devices may be dashboard cameras, security cameras, access control systems, drones, mobile devices of all sorts, including smart watches. An edge device may be any computer device capable of running applications, with a limited computing capability. In one embodiment, edge devices far from the cloud or a big data center. Machine learning at the edge is relevant when sensor data is collected from sources far from the cloud and locally processed by the edge device.

Edge devices can be configured with machine learning aspects, which utilize the data obtained by the edge device, to make certain determinations. For example, for a vehicle safety device, an inward facing dashboard camera (or dashcam) may be used to monitor a driver's mobile device use, and ensure that they remain focused on driving. Similarly, an inward facing dashcam can be used to monitor for other indications of inattention or exhaustion, the wearing of a seatbelt, or other characteristics of the driver. An outward facing dashcam may be also used to track how the driver is driving, whether they are straying outside the lanes, following too closely, etc. A security camera may be used to detect unauthorized people in controlled areas. Other edge devices may include other devices which include sensors and processors to analyze the sensor data. The system enables the configuration or finetuning of the flexible portion of the machine learning system on the edge device. The configuration in one embodiment comprises adjusting one or more parameters in the flexible portion. The data used for the configuration or finetuning may be derived locally on the edge device or received from a server system.

Figure 1:
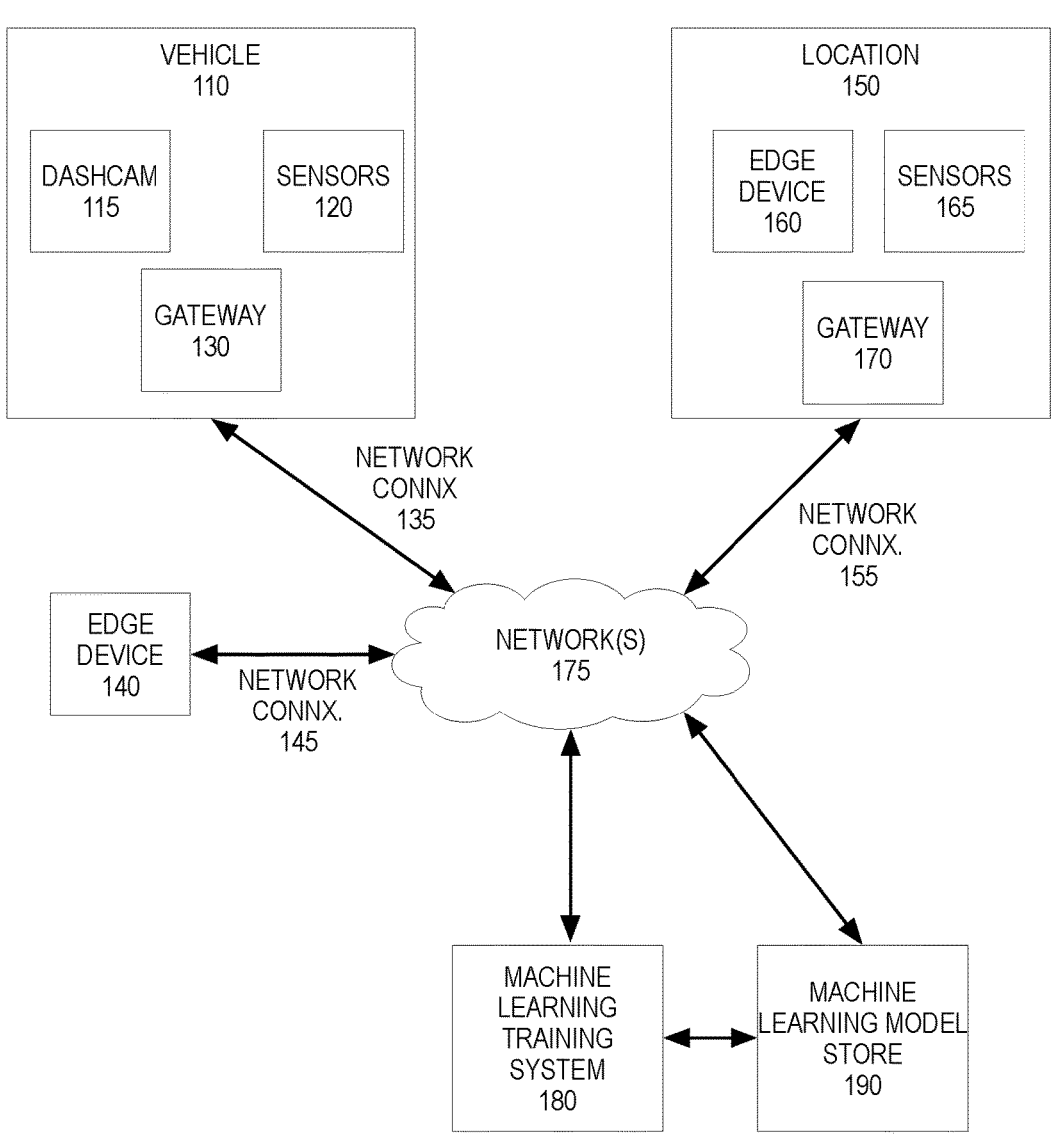
FIG. 1 is a block diagram illustrating an environment in which the edge device system may be used, according to some embodiments.

FIG. 1 is a block diagram illustrating customized edge device system, according to some embodiments. The illustrated system includes multiple edge devices 115, 140, 160 in multiple locations, 110, 140, 150. The edge devices may include dashcams 115 and other edge devices 140, 160 in vehicles 110 or other locations 150.

In one embodiment, the locations 110, 150 may also include other sensors 120, 165. In one embodiment, the edge device 115, 140, 160 connects to a network via gateway 130, 170. The connection 135, 145, 155 in one embodiment uses mobile connectivity (LTE, 5G, etc.) to establish a connection with a network 175.

The edge devices 115, 140, 160 are coupled to a network 175. In one embodiment, the devices are coupled via a mobile connection 135, 145, 155. In another embodiment, another type of network connection may be used. For example, if location 150) is a location where wired network connections are available, the connection 155 may be an Ethernet connection, Wi-Fi connection, or another type of network connection. Network 175 may be the Internet, a cellular network, a local area network, or another type of network. Although network 175 is illustrated as a single network, one of skill in the art would understand that it may include a variety of types of networks.

Machine learning system 180 is also coupled to network 175. Machine learning system 180 in one embodiment is a computer system implementing a training system for deep learning models. In one embodiment, the machine learning system 180 generates a two-layer machine learning system including fixed base portion and a flexible portion. The machine learning models are stored in store 190, in one embodiment.

Utilizing a two-part machine learning system addresses some issues with conventional machine learning. When a machine learning model is running on an edge device, where the computing power and network bandwidth are limited, traditional fine tuning is not an option, because it is either too computationally intensive if performed on device, or takes too long to download if performed on the cloud. By decomposing the model to a fixed basis part, and a flexible calibratable part, the calibration process can be performed on the device. The calibration may be performed with or without human supervision. Therefore, the present system addresses these issues by splitting the system into a fixed base layer machine learning system, with a flexible layer that is calibrated on the device. The resulting machine learning model is optimized for the device, but does not utilize full calibration since the underlying base layer is common across devices. Note that although the "base layer" is referred to as being a general machine learning system, different types of edge devices typically have different base layers. In some embodiments, the same type of edge devices used in different environments may also have different base layers.

The machine learning system 180 uses data to train the machine learning models, and provides the trained machine learning models to machine learning model store 190.

Figure 2:
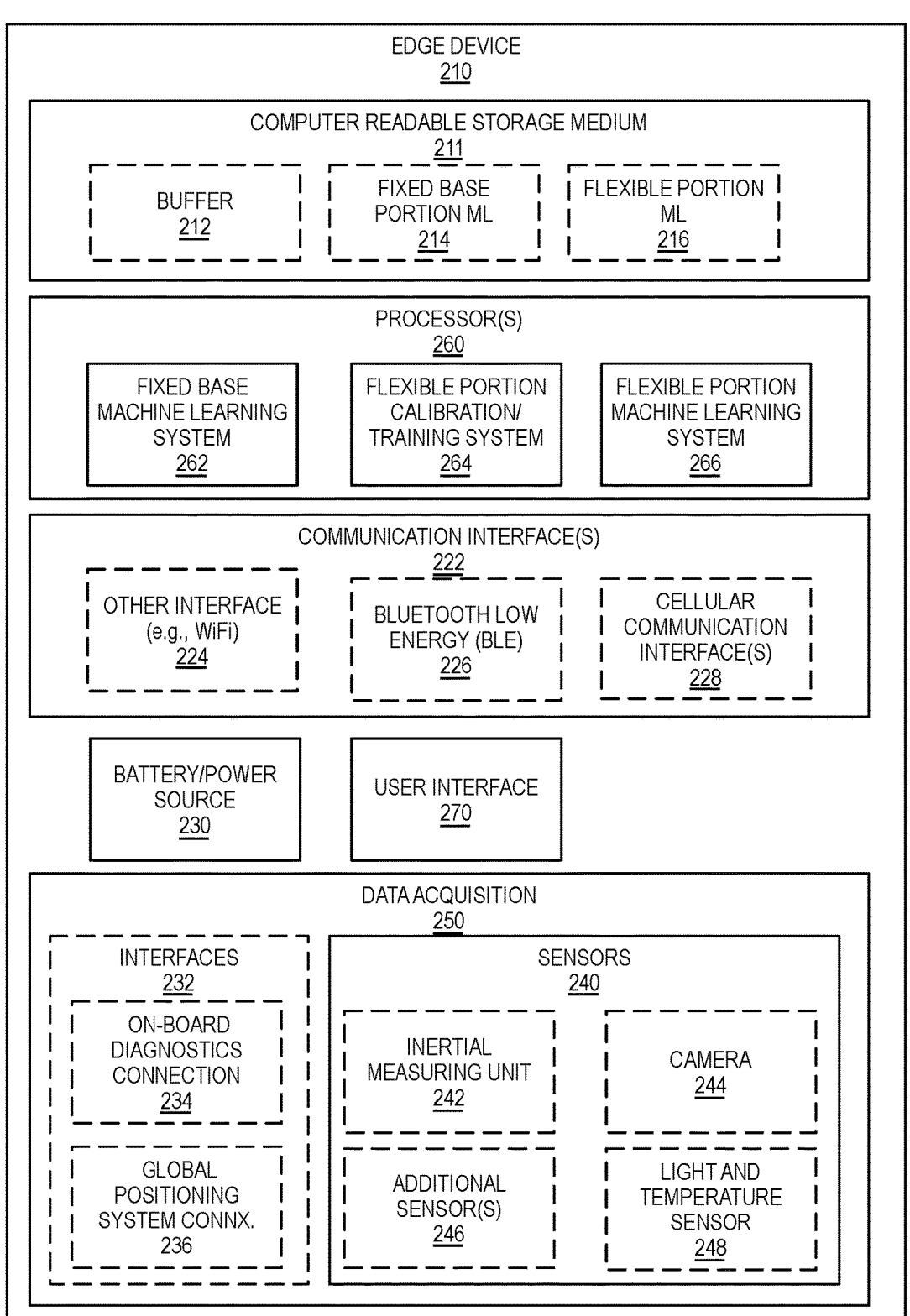
FIG. 2 is a block diagram illustrating an exemplary edge device system, according to some embodiments.

FIG. 2 is a block diagram illustrating an exemplary edge device system, according to some embodiments. Edge devices, in one embodiment, gather data usually in real time to improve processes. Edge devices generally are at the end of a network connection and include processing power and memory, but are limited in both. Edge devices may include sensor systems such as cameras, temperature sensors, etc. The exemplary edge device 210 in one embodiment is a dashboard camera. Other edge devices may include security cameras, and other devices.

The edge device 210 includes a computer readable storage medium 211. The storage medium may be a random access memory (RAM) or other storage device 211 for storing information and instructions to be executed by processor 260. Storage medium 211 may also be used for storing temporary variables or other intermediate information during execution of instructions by processor 260. Storage medium 211 may be a Flash memory or other storage which is capable of storing data when no power is supplied to the system.

Storage medium 211 in one embodiment includes the fixed base portion of the deep learning model 214, and the flexible portion of the deep learning model 216. The optimized deep learning model thus comprises a deep learning model customized for the environment of the device. In one embodiment, the fixed base portion 214 and the flexible portion 216 of the optimized machine learning model are used for identifying/categorizing different elements.

The flexible portion 216 in one embodiment comprises a portion of the machine learning system specifically calibrated to the particular edge device 210, and which may be finetuned/calibrated on the edge device, as will be described below.

The storage medium 211 further includes buffer 212, which is a temporary storage for data. The buffer 212 may be used to temporarily store data before transmission. In addition, the storage medium 211 may include additional memory storage, for storing data captured by the edge device 210. The storage medium 211 has limited storage, in one embodiment, because the edge device is a free-standing device with limited memory capabilities.

Processor 260 runs the machine learning models on the edge device. The processor 260 may be a processing device such as a central processing unit (CPU), a digital signal processor (DSP), graphics processor (GPU), or another type of processor 260. The processor 260 has limited processing capabilities, in one embodiment. The processor runs the fixed base machine learning system 262, the flexible portion machine learning system 266, and the flexible portion calibration training system 264. The calibration training system 264 utilizes the data from the fixed base machine learning system 262, flexible portion machine learning system 266, and optionally user feedback to calibrate the flexible portion 266.

In one embodiment, by providing a separate flexible portion machine learning system 266, the machine learning model can be customized more easily and quickly than a general model, enabling the limited processing of the edge device 210 to calibrate the flexible portion of the machine learning model and provide real-time alerts and feedback, as well as other services.

The edge device 210 in one embodiment can communicate with a server (not shown) via one or more communication interfaces 222. The communication interfaces 222 may include one or more of Bluetooth Low Energy (BLE) 226, cellular communication interfaces 228, or other interfaces 224 which may include Wi-Fi. In one embodiment, when the edge device 210 is a dashboard camera in a vehicle, the communication interface 222 may be a cellular communication interfaces 228. The device 210 may include one or more interfaces. In one embodiment, the edge device 210 utilizes the communication interface 222 best for its current use. For example, to transmit large volumes of data, such as video data, the system may preferentially use cellular interface 228.

The edge device 210 includes a battery and/or other power sources 230. The limitations on power impact the processing, and thus is a further incentive for using the optimized machine learning model, which is more compact and thus faster and computationally cheaper.

The edge device 210 includes data acquisition 250. The data acquisition 250) may include sensors 242 and interfaces 232. The sensors may include a camera 244, an inertial measuring unit 242, light and temperature sensors 248, and additional sensors 246. In addition to on-board sensors 240, the edge device 210 may include interfaces 232 for acquiring data from external data sources. For example, if the edge device 210 is a dashcam, the interfaces 232 may include a connection to the on-board diagnostics (OBD) 234 which obtains data directly from the vehicle. The interfaces 232 may also include a connection to a global positioning system (GPS) 236 provided by an external system. Alternatively, or additionally, the edge device 210 itself may include a GPS among its sensors 240. The specific sensors 240 and interfaces 232 depend on the type of edge device 210. The list of sensors and interfaces provided herein should not be considered an exhaustive list. Additional types of data may also be acquired by data acquisition 250.

The data from sensors and data collection 232 may be stored in buffer 212, and used by processor 260, to analyze using the machine learning models 262, 266. The data may also be sent to external systems via communication interfaces 222.

The system in one embodiment further includes a user interface 270), enabling the user to provide feedback. In one embodiment, the user interface 270 may be part of the edge device 210. In another embodiment, the user interface may be on a remote device such as a mobile device or server. The feedback provided via a remote user interface is received by edge device 210 via communication interfaces 222.

Figure 3:
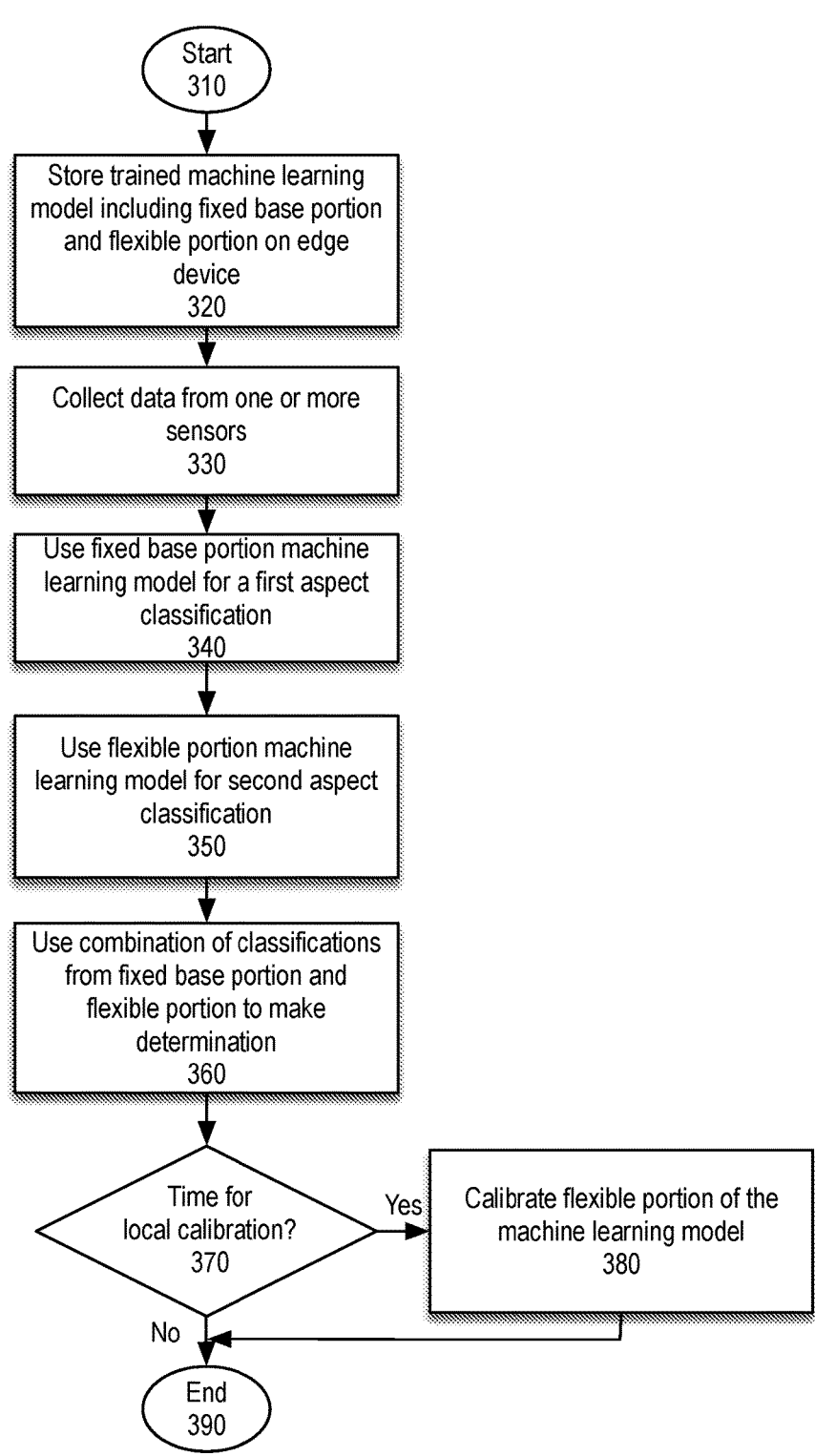
FIG. 3 is an overview flowchart of utilizing a two-part machine learning system in an edge device system, in accordance with some embodiments.

FIG. 3 is an overview flowchart of utilizing a two-part machine learning system in an edge device system, in accordance with some embodiments. The process starts at block 310.

At block 320, the trained machine learning model is stored in memory on the edge device. The trained machine learning model includes a fixed base portion and a flexible portion. In one embodiment, both the fixed base portion and the flexible portion are trained. The training, in one embodiment, is done by a remote machine learning server, or another system. In one embodiment, the system may include multiple machine learning systems, for various tasks. One or more of the multiple machine learning systems may include a fixed portion and a flexible portion. In one embodiment, there is a default configuration for the flexible portion of the system, which is available prior to the customization. In one embodiment, the flexible portion of the system is initialized as a general probabilistic model with a pre-installed default configuration At block 330, data is collected from one or more sensors at the edge device. The sensors may be part of the edge device, or may be coupled to the edge device via wired or wireless connections. In one embodiment, the sensors may include a camera.

At block 340, the fixed base portion machine learning model is used to evaluate the sensor data for a first aspect classification. The first aspect classification utilizes the machine learning system to identify the presence or absence of certain features in connection with the first aspect.

At block 350, the flexible portion of the machine learning model is used to evaluate the sensor data for a second aspect classification. The second aspect, in one embodiment, is a separate feature determined based on the data from the one or more sensors.

At block 360, the combination of the determinations from the fixed base portion and the flexible portion is used to make a determination. The determination may be whether something has occurred-such as distracted driving, someone in a monitored area, etc. The determination may be whether something has not occurred. The determination may be the identification of something such as a presence or absence of a vehicle, or whether there is something that could not be successfully identified. Other uses of deep learning systems may be used. In one embodiment, the aspects determined by the fixed base portion and the flexible portion are independent, and the combination of the two is used in evaluating. In another embodiment, the aspects may be interdependent.

At block 370, the process determines whether it is time for local calibration. Local calibration utilizes the determination and feedback data when available to calibrate the flexible portion of the machine learning model on the edge device. This calibration enables the adjustment of the settings of the edge device based on the real-world location, environment, and conditions under which the edge device operates. In one embodiment, such calibration occurs periodically. In another embodiment, such calibration occurs each time the edge device is initiated, or a session is initiated. In another embodiment, such calibration occurs when a sufficient number of determinations have been made. In one embodiment, such calibration occurs when a remote monitoring system determines that recalibration should occur. Such a determination may be made based on an evaluation of the output of the edge device, by a cloud agent.

If it is time for calibration, at block 380 the flexible portion of the machine learning model is calibrated. The calibration alters the settings of the machine learning model, in one embodiment. The process then ends at block 390.

Figure 4:
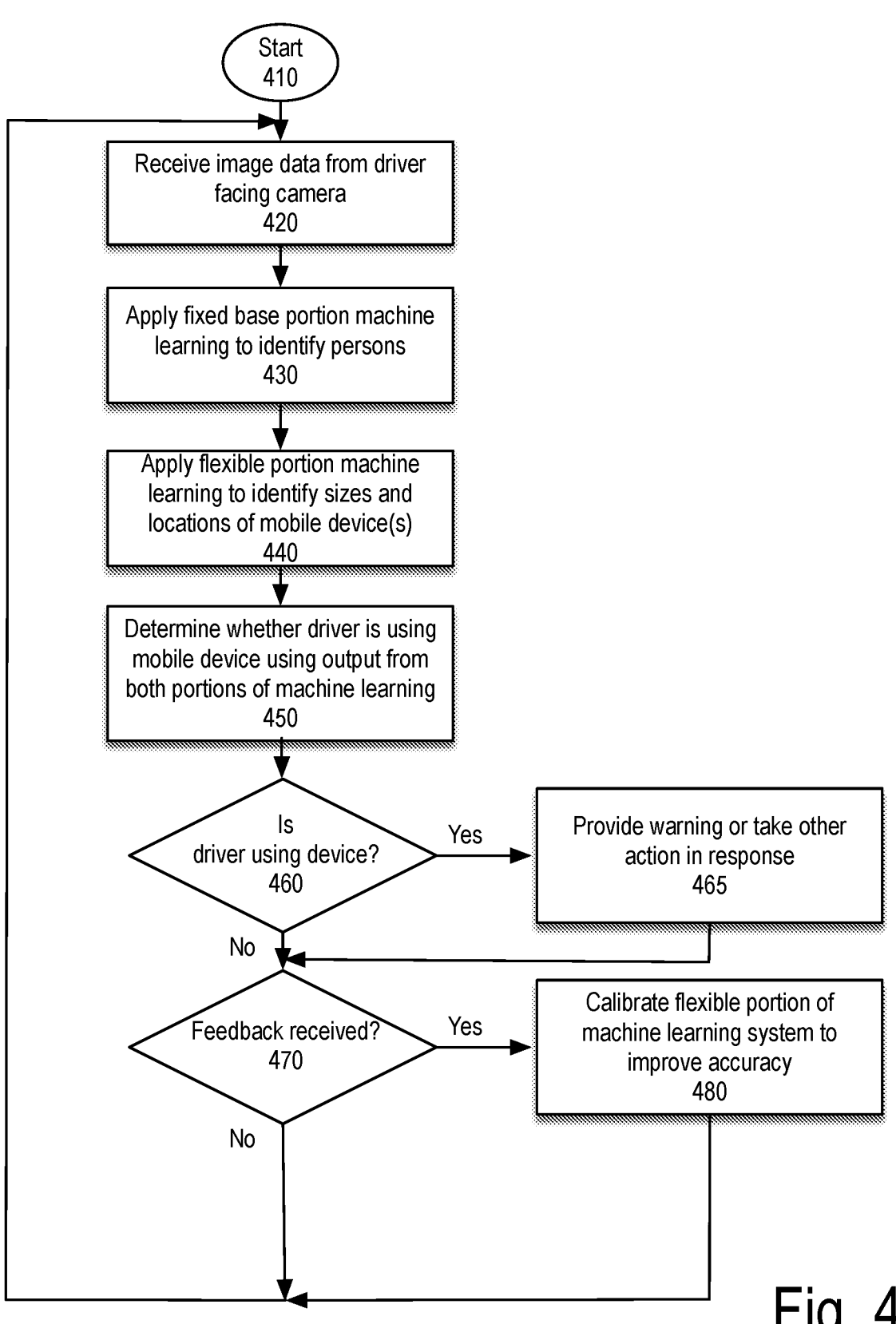
FIG. 4 is a flowchart of using the two-part machine learning system in a driver-facing camera, in accordance with some embodiments.

FIG. 4 is a flowchart of using the two-part machine learning system in a driver-facing camera, in accordance with some embodiments. In this embodiment, the edge device is a dashcam mounted facing a driver, to monitor a driver for fatigue, distraction, device use, seatbelt use, etc. In one embodiment, the inward facing dashcam may monitor for compliance with one or more policies. The policies may be set by a company that utilizes the edge device with a fleet of vehicles . . . . The process starts at block 410. In one embodiment this process is continuously active while the vehicle is being used, to continuously monitor the driver.

At block 420, image data is received from the edge device. In some embodiments, the edge device utilizes a video camera and receives streaming video as image data. In some embodiments, the edge device uses a camera and receives a sequence of images.

At block 430, the fixed base portion machine learning system is used to analyze the image data. In one embodiment, the fixed base portion of the machine learning system identifies a mobile device in the image data, using machine learning.

At block 440, the flexible portion of the machine learning system is used to analyze the data. In one embodiment, the analysis uses the image data and the output of the fixed base portion of the system. In one embodiment, the flexible portion of the machine learning system determines the location of the device and its configuration.

At block 450, the machine learning system determines whether the driver is using the mobile device, based on the presence of the mobile device as determined by the fixed baes portion, in the appropriate location for the driver as determined by the flexible portion, with a phone configuration that matches the driver's device. Thus, the system determines whether the driver is using a mobile phone by recognizing the presence of the phone in someone's hand who is in the driver's location.

At block 460 the process determines whether the driver is using the phone. If so, at block 465 the appropriate action is taken. The appropriate action may be to warn the user, alert a monitoring entity, or otherwise address the issue.

At block 470, the system determines whether feedback about the accuracy of the identification has been received. In one embodiment, the user may provide feedback. Additionally, feedback may be provided by third parties, such as external safety monitors. If feedback is received, at block 480 the flexible portion of the machine learning system is finetuned, or calibrated, based on the feedback to improve accuracy. In one embodiment, the flexible portion is a Gaussian model p (x, y, w, h), which outputs a constant probability before calibration. Based on the feedback, the system would be able to determine the parameters (means and covariances) of the Gaussian model used by the flexible portion of the machine learning. This would improve the accuracy of the original driver mobile usage detection model. Because the flexible portion is simple, in some embodiments it may use 10-20 parameters, even a few labeled feedback instances would be sufficient to improve detection accuracy in the edge device.

For a driver mobile usage detection model, which detects and localizes a driver using a mobile device in a given image, traditional machine learning modeling techniques suffer from a failure pattern that they cannot tell whether the phone is held by the driver or the passenger, including backseat passengers. This is because the model needs to handle a large variety of factors such as field of view and location of the driver. This prevents the model from providing high accuracy in-cab alerts on the driver's usage of mobile devices. However, by utilizing the flexible portion which enables the machine learning model to change after deployment, it simplifies the problem. Once the camera has been installed, those factors are fixed, and even a simple model based on the size and location of a detected phone could be sufficient to determine whether the phone user is the driver. This simple model is the flexible portion of the machine learning model.

Figure 5:
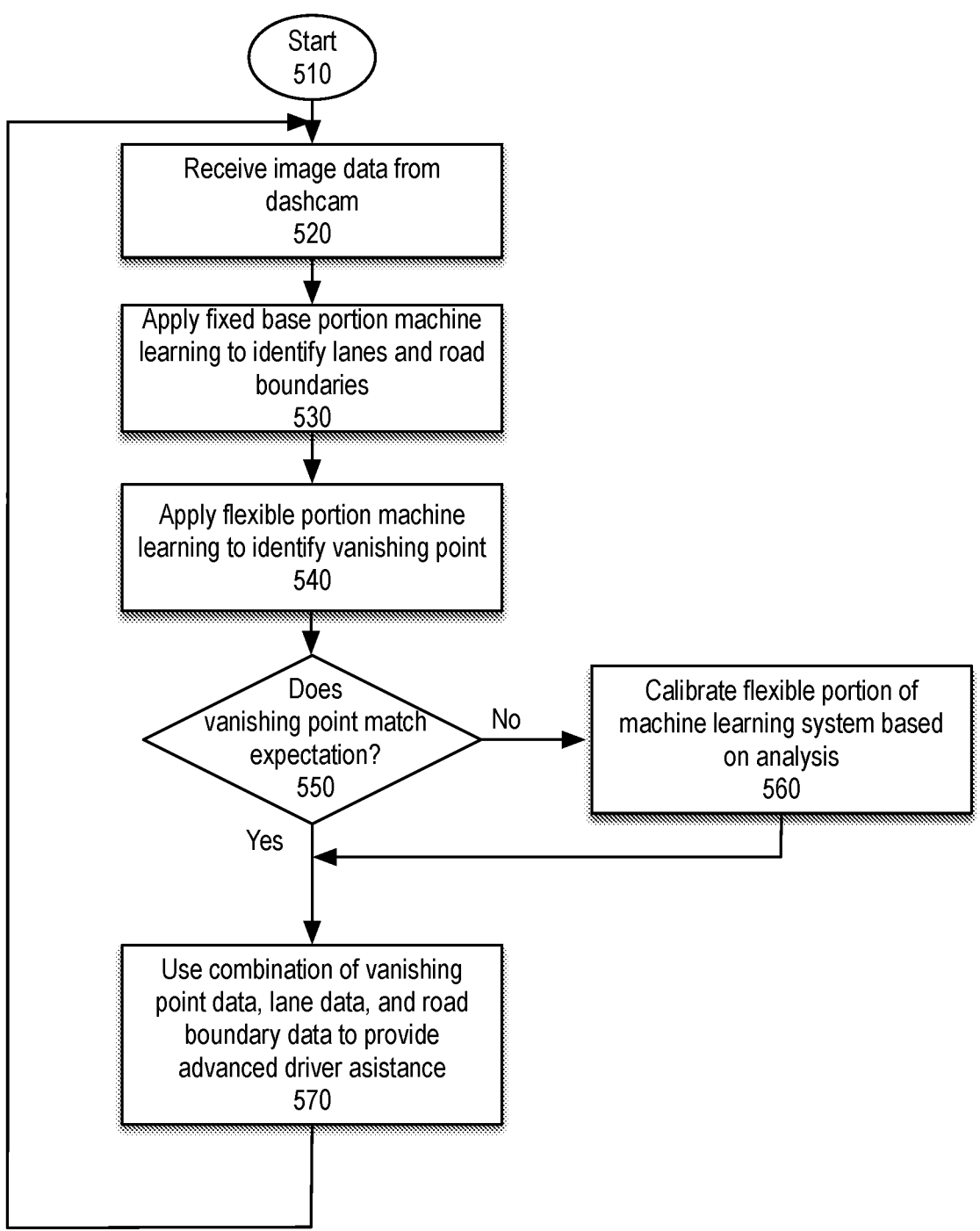
FIG. 5 is a flowchart of using the two-part machine learning system in a dashboard camera system, in accordance with some embodiments.

FIG. 5 is a flowchart of using the two-part machine learning system in a dashboard camera system, in accordance with some embodiments. The system described is part of an advanced driver assistance system (ADAS). The process starts at block 510. In one embodiment, the process starts when the ADAS system is initialized.

At block 520, the image data is received from the dashcam.

At block 530, the fixed base portion of the machine learning system is applied to identify lanes and road boundaries. Road boundaries, or lane detection, is used in auto-driving systems, lane following assistance systems, as well as systems that monitor driving quality.

At block 540 the flexible portion of the machine learning system is applied to identify the vanishing point. The vanishing point is the is a point where the parallel lines of the lane markings appear to converge. The flexible portion of the machine learning system, in one embodiment, identifies the vanishing point. In one embodiment the flexible portion of the machine learning system implementing the vanishing point identification is initialized as a general model with a slight preference on the central point of the view.

At block 550, the process determines whether vanishing point matches the expectation. If not, at block 560, the flexible portion of the machine learning system is finetuned or calibrated, based on the analysis. The parameters are refined along with driving based on the detected lanes and road boundaries. Since the flexible portion only has a few parameters, such refinement is done on device, in one embodiment.

At block 570), a combination of the vanishing point data from the flexible portion, the lane data and road boundary data from the fixed base portion are used to provide advanced driver assistance, or lane detection. The process then returns to block 520 to continue this monitoring.

In the prior art to achieve an accurate estimation of the vanishing point location, in most cases the dashcam needs to be precisely mounted in a certain location and at a certain angle. This is feasible for dashcams mounted by car manufacturers, but not for after-market dashcams. Traditional machine learning models based on after-market dashcams have limited performance because they face a much harder problem with unreliable vanishing point locations compared to the precisely mounted dashcams. For example, a lane detection model knows that a detected road mark line is more likely a lane if it leads to the vanishing point. But such inference is not possible without knowing the location of the vanishing point. In one embodiment, the improved machine learning system utilizes two-stage system with self-calibration, decomposing the model into two parts, a fixed lane detection model and a flexible and calibrated vanishing point probabilistic model. The vanishing point model is initialized as a general model with a preference on the central point of the view. The parameters of the vanishing point model are refined in use, based on the detected lanes and road boundaries. Since the flexible probabilistic model only has a few parameters, such refinement can be done on the edge device.

Figure 6:
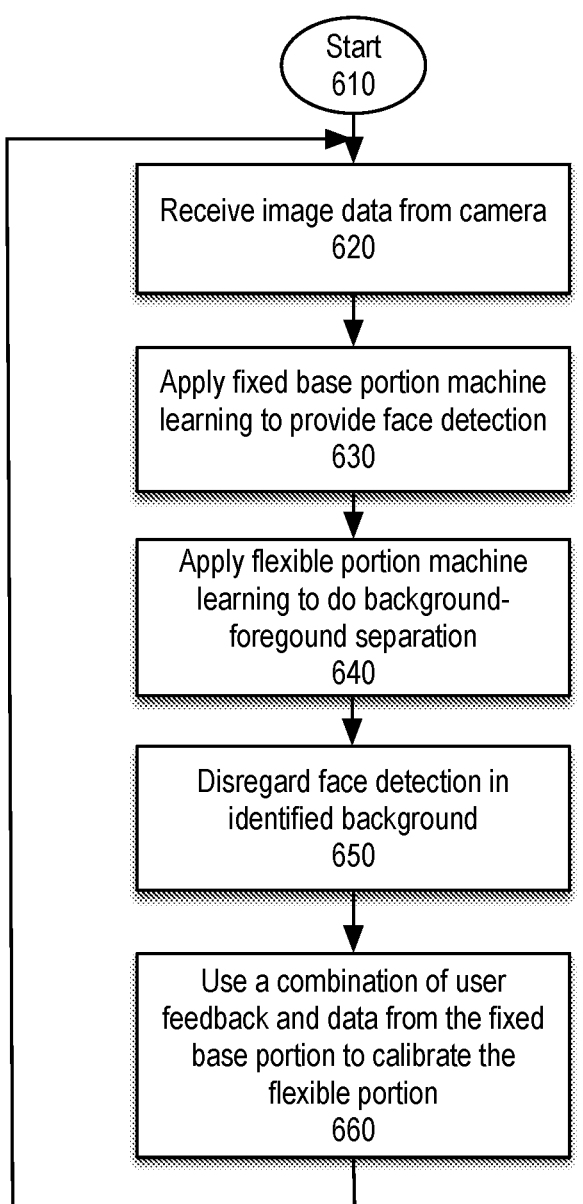
FIG. 6 is a flowchart of using the two-part machine learning system in a camera system, in accordance with some embodiments.

FIG. 6 is a flowchart of using the two-part machine learning system in a camera system, in accordance with some embodiments. The process starts at block 610. This process describes a way to background confusion for surveillance camera systems.

At block 620, image data is received from the camera.

At block 630, the fixed based portion system is used for face detection.

At block 640, the flexible portion of the machine learning system is used to apply background-foreground separation. In one embodiment, the flexible portion background foreground separation component is initialized as a general "everything is foreground" model. After the running of the model, it establishes a per-pixel probabilistic background model, in one embodiment a Gaussian Mixture Model, to tell which pixel is from the background and foreground.

At block 650, the system disregards any face detected in an area tagged as background. The face recognition system is used otherwise as normal.

At block 660, the flexible portion of the system is finetuned or calibrated. In one embodiment, user feedback may be used for the finetuning. In one embodiment, data from the machine learning system is used. The process then returns to block 620 to continue monitoring.

The challenge for machine learning models deployed on surveillance camera systems is to avoid accidentally detecting based on background images. For example, a face detection model can easily be confused by a photo or poster on the wall that includes a face or face-like features. By decomposing the machine learning model into a flexible portion to provide tunable background-foreground separation, the system can ignore the face detection results from the background pixels. Since the camera is often fixed after installation, this kind of per-pixel background is usually sufficient in capability, and also easy to calibrate on device.

The above exemplary implementations are merely exemplary. Furthermore, the various methods of providing the finetuning or calibration of the flexible portion may be combined. Thus, the finetuning may be based on a combination of one or more of user feedback, analysis of the data from the fixed portion of the machine learning system, and analysis of the data from the combination of the fix portion and flexible portion. In one embodiment, the flexible portion is implemented as a Gaussian model, with the finetuning/calibration applied to a limited number of parameters. In one embodiment, the parameters are between 10 s and 100 s of parameters which can be tuned.

Figure 7:
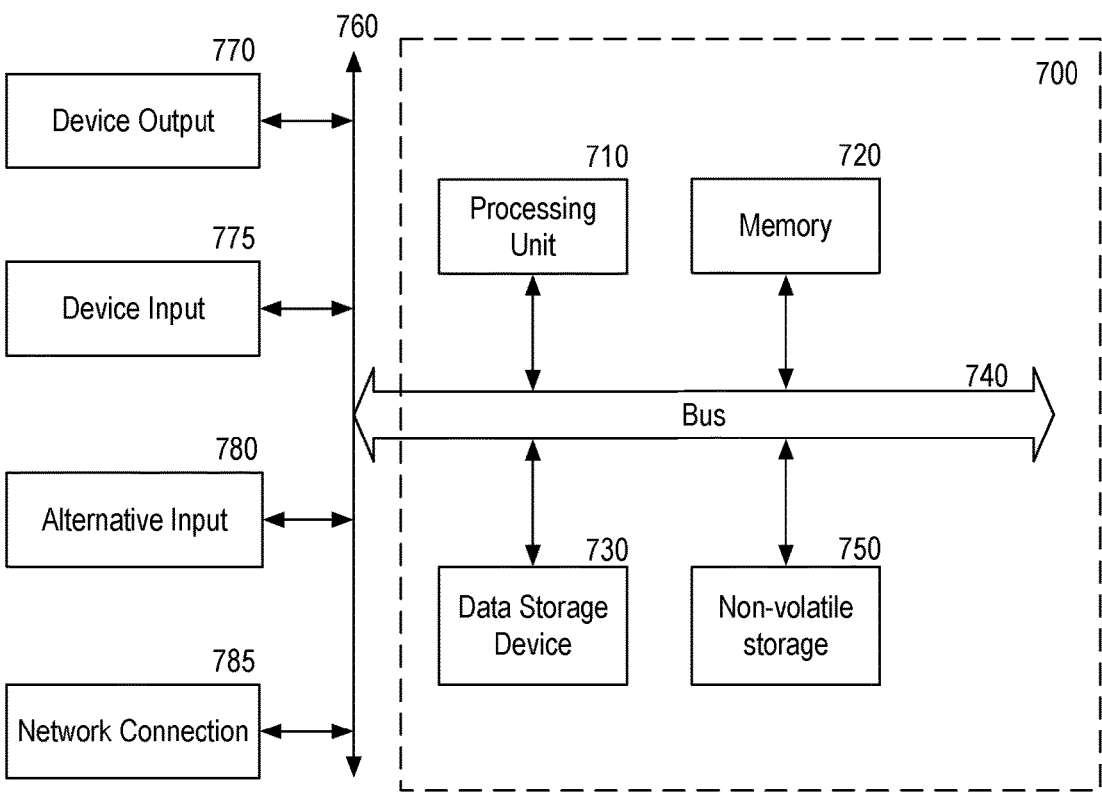
FIG. 7 is a block diagram of a computer system which may be used in some embodiments.

FIG. 7 is a block diagram of a computer system which may be used in some embodiments. It will be apparent to those of ordinary skill in the art, however that other alternative systems of various system architectures may also be used. The cloud agent, machine learning system, and edge devices may include computer systems in accordance with some of the below described embodiments.

The computer system illustrated in FIG. 7 includes a bus or other internal communication means 740 for communicating information, and a processing unit 710 coupled to the bus 740 for processing information. The processing unit 710 may be a central processing unit (CPU), a digital signal processor (DSP), graphics processor (GPU), or another type of processing unit 710.

The system further includes, in one embodiment, a memory 720, which may be a random access memory (RAM) or other storage device 720, coupled to bus 740 for storing information and instructions to be executed by processor 710. Memory 720 may also be used for storing temporary variables or other intermediate information during execution of instructions by processing unit 710.

The system also comprises in one embodiment a read only memory (ROM) 750 and/or static storage device 750 coupled to bus 740 for storing static information and instructions for processor 710.

In one embodiment, the system also includes a data storage device 730 such as a magnetic disk or optical disk and its corresponding disk drive, or Flash memory or other storage which is capable of storing data when no power is supplied to the system. Data storage device 730 in one embodiment is coupled to bus 740 for storing information and instructions.

In some embodiments, the system may further be coupled to an output device 770, such as a computer screen, speaker, or other output mechanism coupled to bus 740 through bus 760 for outputting information. The output device 770 may be a visual output device, an audio output device, and/or tactile output device (e.g., vibrations, etc.)

An input device 775 may be coupled to the bus 760. The input device 775 may be an alphanumeric input device, such as a keyboard including alphanumeric and other keys, for enabling a user to communicate information and command selections to processing unit 710. An additional user input device 780 may further be included. One such user input device 780 is cursor control device 780, such as a mouse, a trackball, stylus, cursor direction keys, or touch screen, may be coupled to bus 740 through bus 760 for communicating direction information and command selections to processing unit 710, and for controlling movement on display device 770.

Another device, which may optionally be coupled to computer system 700, is a network device 785 for accessing other nodes of a distributed system via a network. The communication device 785 may include any of a number of commercially available networking peripheral devices such as those used for coupling to an Ethernet, token ring, Internet, or wide area network, personal area network, wireless network, or other method of accessing other devices. The communication device 785 may further be a null-modem connection, or any other mechanism that provides connectivity between the computer system 700 and the outside world.

Note that any or all of the components of this system illustrated in FIG. 7 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 720, mass storage device 730, or other storage medium locally or remotely accessible to processor 710.

It will be apparent to those of ordinary skill in the art that the system, method, and process described herein can be implemented as software stored in main memory 720 or read only memory 750 and executed by processor 710. This control logic or software may also be resident on an article of manufacture comprising a computer readable medium having computer readable program code embodied therein and being readable by the mass storage device 730 and for causing the processor 710 to operate in accordance with the methods and teachings herein.

The present invention may also be embodied in a portable device containing a subset of the computer hardware components described above. For example, the handheld device may be configured to contain only the bus 740, the processor

710, and memory 750) and/or 720. The portable device may be configured to include a set of buttons or input signaling components with which a user may select from a set of available options. These could be considered input device #1 775 or input device #2 780. The handheld device may also be configured to include an output device 770 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above, such as an edge device. For example, the appliance may include a processing unit 710, a data storage device 730, a bus 740, and memory 720, and no input/output mechanisms, or only rudimentary communications mechanisms, such as a small touchscreen that permits the user to communicate in a basic manner with the device. In general, the more special purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 785.

It will be appreciated by those of ordinary skill in the art that any configuration of the particular machine implemented as the computer system may be used according to the particular implementation. The control logic or software implementing the present invention can be stored on a machine-readable medium locally or remotely accessible to processor 710. A machine-readable medium includes any mechanism for storing information in a form readable by a machine (e.g., a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical, or other forms of propagated signals (e.g., carrier waves, infrared signals, digital signals, etc.).

Furthermore, the present system may be implemented on a distributed computing system, in one embodiment. In a distributed computing system, the processing may take place on one or more remote computer systems, and processing may be shared among a plurality of processors, across a network. The system may provide local processing using a computer system 700, and further utilize one or more remote systems for storage and/or processing. In one embodiment, the present system may further utilize distributed computers. In one embodiment, the computer system 700 may represent a client and/or server computer on which software is executed. Other configurations of the processing system executing the processes described herein may be utilized without departing from the scope of the disclosure.

In the above description, numerous specific details such as edge device/sharding/personalization embodiments, types and interrelationships of system components, and logic partitioning/integration choices are set forth in order to provide a more thorough understanding. It will be appreciated, however, by one skilled in the art, that the invention may be practiced without such specific details. In other instances, control structures, logic embodiments, opcodes, means to specify operands, and full software instruction sequences have not been shown in detail since those of ordinary skill in the art, with the included descriptions, will be able to implement what is described without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations and/or structures that add additional features to some embodiments. However, such notation should not be taken to mean that these are the only options or optional operations, and/or that blocks with solid borders are not optional in certain embodiments.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary embodiments in the other figures. However, the operations of the flow diagrams can be performed by embodiments other than those discussed with reference to the other figures, and the embodiments discussed with reference to these other figures can perform operations different from those discussed with reference to the flow diagrams. Furthermore, the order of operations is not constrained to the order illustrated unless the processes are dependent on each other. Additionally, one or more of the processes described may be interrupt driven, and thus the system does not check for an occurrence, but rather the occurrence sends a notification to trigger actions.

While the above description includes several exemplary embodiments, those skilled in the art will recognize that the invention is not limited to the embodiments described and can be practiced with modification and alteration within the spirit and scope of the appended claims. The description is thus illustrative instead of limiting.

What is claimed is:

1. A method of utilizing an edge device comprising:
storing in a memory a pre-installed trained machine learning model, the machine learning model comprising a fixed base portion and a flexible portion;
initializing the flexible portion as a general probabilistic model, with a default configuration;
calibrating the flexible portion by refining parameters based on an output of the fixed base portion of the machine learning model;
collecting data using one or more sensors on the edge device;
using the fixed base portion of the machine learning model on the data from the one or more sensors for a first aspect classification, the first aspect classification comprising the output of the fixed base portion; and using the flexible portion of the machine learning model on the data from the one or more sensors for a second aspect classification.

2. The method of claim 1, wherein the machine learning model is for detecting mobile device use by a driver, and the flexible portion is for identifying a location of the driver.

3. The method of claim 2, further comprising:
requesting user feedback of the detecting; and
calibrating the flexible portion based on the user feedback.

4. The method of claim 1, wherein the machine learning model is to assist in driving, and the first aspect is lane detection, and the second aspect is vanishing point detection.

5. The method of claim 1, wherein the machine learning model is to assist in monitoring an area, and the first aspect classification is face recognition, and the second aspect classification is background-foreground separation.

6. The method of claim 1, further comprising for an edge device that is a dashcam:
using the fixed base portion of the machine learning model for lane detection; and
using the flexible portion of the machine learning model for vanishing point modeling, further comprising:
initializing the flexible portion as a general probabilistic model, with a default configuration; and
calibrating the flexible portion by refining parameters based on lane detection data from the fixed base portion of the machine learning model.

7. The method of claim 1, further comprising:
determining that the flexible portion of the machine learning model should be calibrated upon one or more of: initiation of the edge device, start of a session on the edge device, after a sufficient number of classifications have been made, and based on an evaluation of the output of the edge device; and
initiating the calibrating of the flexible portion.

8. A method of utilizing a vehicle safety device comprising:
storing in a memory a pre-installed trained machine learning model, the machine learning model comprising a fixed base portion and a flexible portion;
initializing the flexible portion as a general probabilistic model, with a default configuration;
collecting image data using one or more sensors on the vehicle safety device;
using the fixed base portion of the machine learning model to evaluate the image data for a first aspect classification;
using the flexible portion of the machine learning model to evaluate the image data for a second aspect classification;
adjusting one or more parameters of the general probabilistic model of the flexible portion on the vehicle safety device, based on an output of the machine learning model and user feedback.

9. The method of claim 8, wherein the machine learning model is to detect mobile device use by a driver, and the flexible portion is used to determine a location of the driver within the image data.

10. The method of claim 8, wherein the machine learning model is to identify lanes in a road, and the flexible portion is used to determine a vanishing point of lane markings.

11. The method of claim 8, wherein the machine learning model is to identify a person, and the flexible portion is used for background-foreground separation.

12. The method of claim 8, further comprising:

determining that the flexible portion of the machine learning model should be calibrated upon one or more of: initiation of the vehicle safety device, start of a session on the vehicle safety device, after a sufficient number of classifications have been made, and based on an evaluation of the output of the vehicle safety device; and initiating the calibrating of the flexible portion.

13. An edge device comprising:

a memory to store a pre-installed trained machine learning model, the machine learning model comprising a fixed base portion and a flexible portion;

one or more sensors to collect data;

a processor to run the fixed base portion of the machine learning model on the data from the one or more sensors for a first aspect classification;

the processor to run the flexible portion of the machine learning model on the data from the one or more sensors for a second aspect classification;

wherein the flexible portion of the pre-installed trained machine learning model is initialized with a default configuration, and the processor calibrating the flexible portion of the machine learning model refines one or more parameters, based on the first aspect classification from the fixed base portion of the machine learning model.

14. The edge device of claim 13, wherein the machine learning model is to detect mobile device use by a driver, and the flexible portion is used to determine a location of the driver within the data.

15. The edge device of claim 13, wherein the machine learning model is to identify lanes in a road, and the flexible portion is used to determine a vanishing point of lane markings.

16. The edge device of claim 13, wherein the machine learning model is to identify a person, and the flexible portion is used for background-foreground separation.

17. The edge device of claim 12, further comprising:

a user interface to receive user feedback of the first aspect classification; and the processor utilizing the user feedback in the calibrating.

18. The edge device of claim 13, further comprising for an edge device that is a dashcam:

the processor using the fixed base portion of the machine learning model for lane detection; and the processor using the flexible portion of the machine learning model for vanishing point modeling, further comprising:

initializing the flexible portion as a general probabilistic model, with a default configuration; and calibrating the flexible portion by refining parameters based on lane detection data from the fixed base portion of the machine learning model.

19. The edge device of claim 13, wherein the flexible portion of the machine learning model is calibrated periodically.

20. The edge device of claim 19, wherein the flexible portion of the machine learning model is calibrated each time the edge device is initiated.

* * * * *